Sept. 7, 1965 A. F. S. POLLOCK 3,204,343
APPARATUS FOR TEACHING OR STUDYING MATHEMATICS
Filed March 6, 1962
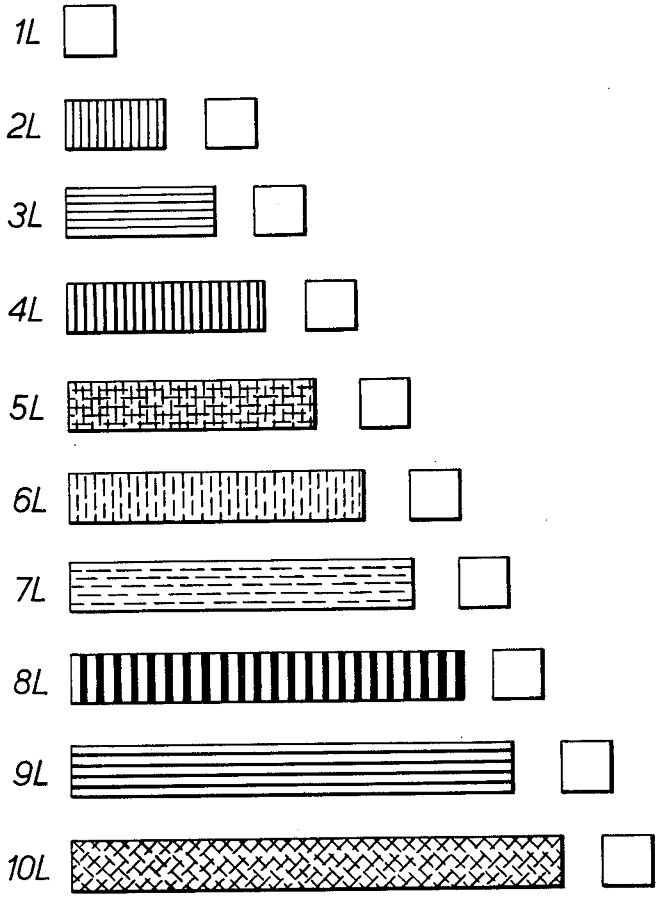
Inventor
Algernon Frederick Seton Pollock
By Cushman, Darby & Cushman
Attorneys 3,204,343
Patented Sept. 7, 1965

3,204,343

APPARATUS FOR TEACHING OR STUDYING MATHEMATICS

Algernon Frederick Seton Pollock, 76 Berkely Ave., Reading, England

Filed Mar. 6, 1962, Ser. No. 177,823
Claims priority, application Great Britain, Aug. 31, 1961, 31,426/61
4 Claims. (Cl. 35—31)

The present invention relates to an apparatus for teaching or studying mathematics.

It has been proposed to provide apparatus consisting of or comprising a set of differently colored cuboid and rod like elements of corresponding right angular cross-section, employing a cube element representing a basic unit, e.g., 1 centimeter and colored white, and differently colored rod or bar elements increasing in length in simple series, viz 2, 3, 4 times the length L of an edge of the basic unit, e.g., 2 cms., 3 cms., etc., the aim being to provide color-links for mathematically related elements by means of colors assigned to the different elements, the relative proportions of the elements in both length and preferably weight being such that the set provides a model displaying the algebraic laws and principles that are implicit in the relationship of all rational numbers to one another as manifested in the relative proportions of these spatial forms so that the device offers a model for the study of the set of the rational numbers and, thus, a valuable basis for the teaching of algebra. At least one apparatus consisting of a set of elements having the same structural properties and a color system applied to the elements is known.

The apparatus referred to, known as the "Numbers in Color," has a color-series in respect of the lengths 1 to 10 aiming to introduce an associative (psychological) link as between certain of the numbers 1 to 10 that facilitates the learning of arithmetic. The principles embodied in this apparatus and the use made of those principles in terms of the actual colors chosen have been said to be:

(a) That there is an analogy between music and numbers.

(b) That a pipe double the length of another pipe produces a note an octave lower.

(c) Numbers can be grouped in families of doubles for educational purposes.

Based on these principles 2L, 4L and 8L were regarded as a number-family, 4L being the double of 2L and 8L being the double of 4L.

The second "family" of doubles was 5L and 10L.

The third "family" was 3L, 6L, 9L, and here a departure was made from the principle of doubling by including 9, this departure having been juistified by regarding it as forming a "minor chord," a notion derived from the musical analogy upon which the color series was based.

The numbers 1 and 7 remained, and were treated as two "families" having only one member each. The former was unique as being the unit, and the latter as being neither the double nor the half of any other number in the series.

Allocating white, black, and the primary colors red, blue, and yellow to the five "families" chosen, the color families were associated with the number families as follows:

| White | Red | Blue | Yellow | Black |
|---|---|---|---|---|
| 1 | 2, 4, 8 | 3, 6, 9 | 5, 10 | 7 |

The color series for the "reglettes" (as the elements have been called) was as follows:

1 cm. White (so called, but actually in natural wood)
2 cm. Red
3 cm. Green
4 cm. Pink (sometimes referred to as crimson)
5 cm. Yellow
6 cm. Dark Green
7 cm. Black
8 cm. Brown
9 cm. Blue
10 cm. Orange

| Red Family | Blue Family | Yellow Family |
|---|---|---|
| 2 red | 3 light green | 5 yellow |
| 4 pink | 6 dark green | 10 orange |
| 8 brown | 9 blue | |

White and Black had only one member each, and were allocated to 1 and 7 respectively.

In this way, *matching* colors were produced to induce associations for numbers regarded as mathematically related but it will be noticed that this was done by introducing the key-color chosen without regard to any other component in the resultant color.

Thus, two greens are found in the blue family (produced by adding yellow to blue). A brown is found in the red family (produced by adding blue and yellow to red). An orange is found in the yellow family (produced by adding red to yellow).

I consider that the color series hitherto chosen has not been truly founded and I have devised an apparatus based upon clear mathematical principles which will enable the appropriate color of each element to be readily determined so as to draw attention to all the mathematical (multiplicative) relationships to be found in the set without direct reference to particular numbers.

To facilitate the description of this improved apparatus and at the same time to draw attention to its algebraic character, it will be described, and its elements identified, by reference to a basic element which is a cube to which will be assigned the letter or symbol L, which refers to the length of an edge thereof and, by inference, to the basic element itself. The other elements of the apparatus each of which is cuboid in shape with a rectangular cross-section congruent with a face of L will be described and identified by reference to their respective lengths as compared with the length L. Thus 2L, 3L, 4L . . . will denote elements of the cuboid shape specified which are respectively twice, three times, four times . . . the length of L, the qualifying numerals accordingly representing or being factors operating as indices of relationship and not simple numbers of quantity. They are, thus, the algebraic factors which in arithmetical notation are written $2x$ . . . , $3x$ . . . , $4x$ . . . with L being an algebraic symbol which in such arithmetical notation could be the universal factor written as $1x$ (one times). Though the basic element L is necessarily a cube of some determined size, it has no determinate number value and is capable of representing any quantity or number (including of course 1). Further, these numerals will be treated in accordance with algebraic usage to draw attention to the parallel function of the colors applied to the respective elements and to make the algebraic color-analogue clear, so that, for example, $2^2L$ and 4L will be synonymous and 2(5L) and 10L will equally be synonymous and will denote respectively the elements four times and ten times the length of the basic element L.

The improved apparatus according to the invention comprises a set of elements including a basic element which is a cube and a number of further elements increasing in length up to at least ten times the length of L of an edge of the basic element and thus consisting of a set of elements of L, 2L, 3L, 4L, 5L up to at least ten; the said elements 2L, 3L and 5L each being of a different primary color; the said elements $2^1L$, $2^2L$, $2^3L$ being each of the same primary color but in different intensities or powers of that color; the said elements $3^1L$, $3^2L$ being likewise each of the same primary color but in different intensities or powers of that color; the set of elements including at least one element that in terms of dimensional relationship is a multiple by length of two of the elements 2L, 3L, 5L and is of a composite color produced by combining the primary colors of those two elements of which it is a multiple by length; the element L and at least one element included in the set which is a multiple of L but not a multiple of 2L, 3L or 5L, having an optical effect devoid of discernible color association with any one or more of the three said primary colors.

A basic need to fulfill the foregoing requirements is that different colors be chosen for the elements of lengths 2L, 3L and 5L and that these be primary colors (whether or not in a tint of that primary color produced by the addition of white). By primary colors I mean colors which, however they may vary in tone, tint or shade, are in common speech described by persons of normal or average color-vision as red, blue and yellow. In the sense so defined a primary color does not lose that character merely because it has been given a particular tone by the admixture or addition of a touch of color other than white as, for example, a touch of blue in red to produce a crimson or maroon red, provided such persons would regard the color so produced as red. It would however in the sense so defined, cease to be primary if the addition of color (other than white) would lead such persons not to name it or regard it as red, blue or yellow as the case may be. Thus the addition of red to yellow in a very small quantity would be aptly described, nevertheless, as yellow, but an increase of the red component would lead such persons to call it orange or amber and to regard yellow as an inappropriate expression for the optical effect produced. It would then, under this definition cease to be a primary and become a composite color. The combination of red, as so defined, and white, which produces pink is, however, primary because such persons would regard it as a tint of red and pink is thus deemed to be red or "a red" within the definition.

The specific primary colors may be (a) a tint of the primary color red for the element 2L; (b) a tint of the primary color blue for the element 3L and (c) a tint of yellow for the element 5L, but these colors in relation to the elements in question may be interchanged. In theory they can be distributed in six permutations. In practice it is inconvenient to allocate yellow to 2L, or even 3L, although this is not excluded, since it is more difficult to reproduce yellow in any of the foregoing media so as to obtain the distinction in intensity desired and therefore it is highly desirable that yellow be applied to the element 5L as before.

It is however quite suitable to make the element 2L in the primary color blue and the element 3L in the primary color red.

It is preferred to make the element representing each power in the primary color of the prime number element in greater intensity, i.e., L2, pink (or light blue); L4 a deeper red, e.g., scarlet (or a deeper blue, e.g., Cambridge blue); L8 a still deeper red, e.g., crimson (or a still deeper blue, e.g., indigo blue) and the element L9 a deeper tint of the color of element L3, e.g., royal blue (or a deeper red, e.g., scarlet).

In the preferred apparatus, the element 6L will then be a combination of the colors of 2L and 3L and the element 10L a combination of the colors 2L and 5L.

The basic element is advantageously made white or, at least so as to present an optical effect which in the context of the colors of the set would readily be called white e.g., if the elements are of wood, it may be the natural wood color.

The element 7L contrary to previous practice will preferably be made of a tint of grey which being composed of black (which blots out color by extinguishing the white base of color) and white (which is the base for the display of colors and governs their intensities) so that 7L may be regarded as linked with the basic element of which it is a multiple but seen to have no such relationship with any other element of the set.

A set of elements from 1 cm. to 10 cm. in length, extendable from eleven to infinity (in principle) will produce a basic algebraic set.

A set may conveniently consist of twelve elements including elements 11L and 12L in which case it is preferred that 11L shall be a deeper grey than 7L (or black) and 12L shall be a combination of the colors of 3L and 4L.

All the colors may be regarded as generated in the basic white which represents the unit from which all numbers are generated and the whole series moves in deepening tones from white, via color, to the dark area beyond the color spectrum.

The apparatus will preferably comprise appropriate numbers of each element constituting a set and the numbers of each particular element present will generally be greater for the basic element and then, progressively, lessen although not necessarily with each consecutive increase in length.

A suitable container, if desired compartmented, may be provided as part of the apparatus and compartmenting may be appropriate to the lengths of the various elements comprising a set; moreover instructional matter may be included.

One example of apparatus according to the invention will now be described.

This consists of 292 cuboid elements, each 1 square cm., in cross-section destributed in sets having lengths ranging serially from 1 cm., to 12 cm., each length having a characteristic color as set out below:

| Length, cm. | Color | Number of Sections |
|---|---|---|
| 1 | White | 96 |
| 2 | Pink | 48 |
| 3 | Light blue | 36 |
| 4 | Scarlet | 24 |
| 5 | Yellow | 16 |
| 6 | Violet | 16 |
| 7 | Grey | 12 |
| 8 | Crimson | 12 |
| 9 | Royal blue | 12 |
| 10 | Amber | 12 |
| 11 | Dark gray | 4 |
| 12 | Mauve | 4 |
| | | [1] 292 |

[1] Total number.

The number of sections in the whole set and in its subsets is not a matter of principle but of educational and practical convenience.

The foregoing principles are precisely followed and the colors are operated upon throughout in purely mathematical ways to generate the color series, which is itself capable of extension beyond 12 until all the numbers generated become too dark to distinguish color.

This is capable of expression in tabular form.

*Primes and powers of primes*

| No. series | White | Red | Blue | Yellow | Black | Composites | Color |
|---|---|---|---|---|---|---|---|
| 1 | $1^1$ | | | | | | White. |
| 2 | | $2^1$ | | | | | Pink. |
| 3 | | | $3^1$ | | | | Light blue. |
| 4 | | $2^2$ | | | | | Scarlet. |
| 5 | | | | $5^1$ | | | Yellow. |
| 6 | | | | | | $2\times3$ | Violet. |
| 7 | | | | | $7^1$ | | Grey. |
| 8 | | $2^3$ | | | | | Crimson. |
| 9 | | | $3^2$ | | | | Royal blue. |
| 10 | | | | | | $2\times5$ | Amber. |
| 11 | | | | | $11^1$ | | Dark grey. |
| 12 | | | | | | $2^2\times3$ | Mauve. |

It will be seen that the color factor groups are:

Primes and their powers; 1; 2, 4, 8; 3, 9; 5; 7 and 11.

Composites: 6, 10, 12, NOT being members of any group, but having affinity with two such groups.

By moving horizontally along the line of the table for any number, and using the colors in the intensities dictated by the mathematical principles involved, as shown in the columns, the correct color is obtained.

In each case, white is a component color, but, as every successive intensity of white reproduces no color change (just as $1^n=1$), the white element is progressively displaced by the addition of the appropriate color factor set out upon each line. The white content, accordingly, diminishes for each group that has more than one member shown.

The series can be extended, in principle, to infinity, e.g., $15=3\times5$. The lowest intensity (or "power") of blue is combined with yellow to produce light green. $45=3^2\times5$. The second intensity (or "power") of blue is combined with yellow to produce dark green. $20=2^2\times5$. The second intensity of red (namely scarlet) is combined with yellow to produce a deep red-amber often described as flame-color.

But in practice the series moves into blackness and indistinguishable darkness, the 15, 20, 25 . . . 100 series persisting after the rest of the numbers have lost their color-character.

Because the primary colors are treated on strictly mathematical principles as *factors* or *exponents*, the results are invariably consistent. Composite factors are seen by their color to have affinity with the prime factors they combine. Thus, violet is seen to be a color having affinities with both the red and the blue groups, and it can be seen that both these primaries are at the power of 1. Hence the white base produces the pale red/blue combination of violet, i.e., white, red, and blue, and two lattter at low intensity or in mathematical terms $2'\times3'\times1^{2-6}$.

Since the color-factors herein chosen are factors and operate as such, the adding of color is analogous to a multiplication. Thus $2\times3$=pink+light blue, and $2^2$=the red element as found in the pink added to itself. reducing the white component to produce scarlet.

An example of a color system where the element 2L and 3L of the three elements 2L, 3L and 5L are varied in color as compared with the previous example and the consequent change of color in the other elements is the following, in a set of twelve:

1L --- White
2L --- Light blue
3L --- Pink
4L --- Cambridge blue
5L --- Yellow
6L --- Violet
7L --- Grey
8L --- Indigo blue
9L --- Scarlet
10L --- Light green
11L --- Dark grey
12L --- Mauve (a bluer mauve than in the other series)

Though the disposition of colors is changed (in relation to the specific disposition described in the earlier example) the mathematical principles are not. There are three intensities of blue, e.g., light blue, Cambridge blue and indigo instead of two (e.g., light or Cambridge blue and royal blue) as before and two only of red instead of three. Elements 1L, 7L and 11L need not vary. Element 6L need not change if the previous tints for element 2L and 3L are not changed, e.g., can be of pale violet. Element 10L is then a light green and element 12L a rather bluer mauve than before.

It is considered that the principle of the idea is displayed by the first six elements in serial order, although the minimum set which permits display of the principle in respect of the orthodox decimal notation is a set of ten in serial from 1 to 10 and this, of course, is an important requirement for the purposes of the invention.

I have given an example previously of the numbers of each element suitable to form a complete apparatus and a probable minimum set which is useful for teaching arithmetic is approximately:

| | Sections |
|---|---|
| 1.—White | 10 |
| 2.—Pink (or light blue) | 5 |
| 3.—Light blue (or pink) | 3 |
| 4.—Scarlet (or Cambridge blue) | 2 |
| 5.—Yellow | 2 |
| 6.—Violet | 1 |
| 7.—Grey | 1 |
| 8.—Crimson (or indigo blue) | 1 |
| 9.—Royal blue (or scarlet) | 1 |
| 10.—Amber (or light green) | 1 |
| | 27 |

The restrictions upon educational utility in such a set would, however, be severe, and the number in a set for school use cannot be reduced below the following number without seriously imparing the teaching value:

| | Sections |
|---|---|
| 1.—White | 20 |
| 2.—Pink (or light blue) | 10 |
| 3.—Light blue (or pink) | 8 |
| 4.—Scarlet (or Cambridge blue) | 3 |
| 5.—Yellow | 4 |
| 6.—Violet | 4 |
| 7.—Grey | 4 |
| 8.—Crimson (or indigo blue) | 3 |
| 9.—Royal blue (or scarlet) | 3 |
| 10.—Amber (or light green) | 10 |

The utility of the invention is not affected by mere variations in tints and shades of the same colors in the same order; and the choice of grey for the elements 7 and 11 is not critical, so long as the distinctiveness of these elements is preserved. A natural wood (not actually painted white) which can reasonably be called white is likewise, not critical.

The centimeter base is not essential to the invention. The apparatus must of course be based upon a cube of a predetermined size which is then made the basis of a set of cuboids (rectangular parallelepipeds) each having a rectangular cross-section identical to one face of the cube and lengths serially arranged as $L\times2$, $L\times3$, $L\times4$, . . . $L\times10$ (L being the length of one edge of the cube as stated aforesaid) and with the colors chosen as herein defined.

The principles involved in the present color factor series are completely different from those involved in aforesaid "Numbers in Color" system.

The colors are chosen for that system to produce a matching effect by introducing into the (differently disposed) families the key-color of the number group devised. To produce the color regarded as suitable for the purpose primaries from other groups were admixed. Thus, the red family contains brown (composed of red, blue and yellow which in my apparatus if so extended would be found in an element 30 cm. long). The blue family contains two green members (composed of blue and yellow which in my apparatus if sufficiently extended would be found in the elements 15 and 45 cm. long) and 10, incorrectly allocated to the 5 family (yellow) yields orange distinguished from yellow by a touch of red.

In the present apparatus as the colors change and deepen in their respective groups, the length and weight of the sections themselves increases in regular increments, so that the principle of relative proportions (which is the basic principle of mathematics) is displayed in three media, namely, dimension, weight and color; and all three reflect the behavior of numbers.

Briefly the set of sections from 1 cm. to 10 cm., extendable from 11 cm. to infinity (in principle) is the basic algebraic set. It extends to 10 cm., to permit its use in respect of the accepted decimal notation. It may go to 12 cm., and beyond, to study notational bases greater than 10.

Though the herein described set restricted to 12 cm. displays, in principle, the algebraic bonds implicit in the relationship of numbers to one another, its utility can be increased by the addition of identical members to each of the twelve elements comprising the basic set, as has previously herein been mentioned, and a point is reached at which further additions are in excess of what is needed for the purpose envisaged. 292 elements, disposed as set out above, are serviceable for classroom use.

What I claim is:

1. In an appartus for teaching or studying mathematics comprising a set of elements including a basic element which is substantially white in relation to the colors of the other elements of the set and which is a cube and a number of further elements increasing in length up to at least ten times the length L of an edge of said cube, said elements being identified as 2L, 3L, 4L, 5L, up to 10L, the improvement comprising: (1) the elements 2L, 3L, and 5L each being of a different primary pigment color, (2) the elements 2L, 4L and 8L being of the same primary color but in different intensities of that color obtained by increasing the pigment content in relation to the basic white in 4L with reference to 2L and 8L with reference to 4L, (3) the elements 3L and 9L being of the same primary color but in different intensities of that color obtained by increasing the pigment content in relation to the basic white in 9L with reference to 3L, (4) the element 6L being a composite color of the primary colors of the elements 2L and 3L, (5) the element 10L being a composite color of the elements 2L and 5L, (6) the element 7L being substantially gray and devoid of discernible color association with any of the said primary colors and related to the basic element by its white content.

2. Apparatus as in claim 1 in which the elements 2L, 3L and 5L are tints of the primary colors red, blue and yellow, respectively, and in which the colors of the elements 4L, 8L and 9L are of greater intensities than the colors of the elements 2L, 4L and 3L, respectively.

3. Apparatus as in claim 1 in which the elements 2L, 3L and 5L are tints of the primary colors blue, red and yellow, respectively, and in which the colors of the elements 4L, 8L and 9L are of greater intensities than the colors of elements 2L, 4L and 3L, respectively.

4. Apparatus as in claim 1 in which the set of elements includes an element 11L whose color is a more intense shade of gray than the color of element 7L and an element 12L whose color is a combination of the colors of the elements 3L and 4L.

References Cited by the Examiner

UNITED STATES PATENTS

| | | | |
|---|---|---|---|
| 356,167 | 1/87 | Shannon | 35—31.6 X |
| 971,185 | 9/10 | Freeman | 35—31.6 X |
| 2,654,963 | 10/53 | Van Dijck | 35—70 |
| 3,002,295 | 10/61 | Armstrong | 35—70 X |

FOREIGN PATENTS

| | | |
|---|---|---|
| 16,982 | 1889 | Great Britain. |
| 866,141 | 4/61 | Great Britain. |

LEO SMILOW, *Primary Examiner.*

LAWRENCE CHARLES, JEROME SCHNALL, *Examiners.*